United States Patent
Dos Remedios et al.

(10) Patent No.: US 8,646,046 B2
(45) Date of Patent: Feb. 4, 2014

(54) DISTRIBUTED DIGITAL RIGHTS MANAGEMENT SYSTEM AND METHOD

(75) Inventors: Alwyn Dos Remedios, Vaughan (CA); Stefan Scherer, Ottawa (CA); Mark Bapst, South Barrington, IL (US); Satyajit Patne, Irvine, CA (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 1313 days.

(21) Appl. No.: 12/121,558

(22) Filed: May 15, 2008

(65) Prior Publication Data

US 2009/0288137 A1 Nov. 19, 2009

(51) Int. Cl.
G06F 21/00 (2013.01)
(52) U.S. Cl.
USPC ........ 726/4; 726/2; 726/6; 713/168; 713/193; 713/194; 455/411; 380/277
(58) Field of Classification Search
USPC ...................................... 726/4, 26
See application file for complete search history.

(56) References Cited

U.S. PATENT DOCUMENTS

| | | | |
|---|---|---|---|
| 7,757,098 B2* | 7/2010 | Brannock et al. ............. | 713/187 |
| 7,761,910 B2* | 7/2010 | Ransom et al. .................... | 726/6 |
| 2005/0050361 A1* | 3/2005 | Miyanaga ..................... | 713/201 |
| 2005/0100167 A1* | 5/2005 | Alve et al. ..................... | 380/277 |
| 2005/0113071 A1* | 5/2005 | Nagata .......................... | 455/411 |
| 2006/0141924 A1* | 6/2006 | Mende et al. ................. | 455/3.01 |
| 2006/0179311 A1* | 8/2006 | McCorkle et al. ............ | 713/168 |
| 2008/0022108 A1* | 1/2008 | Brannock et al. ............. | 713/176 |
| 2008/0072070 A1* | 3/2008 | LaMacchia et al. .......... | 713/193 |
| 2009/0106563 A1* | 4/2009 | Cherpantier .................. | 713/194 |
| 2009/0325566 A1* | 12/2009 | Bell et al. ..................... | 455/419 |

FOREIGN PATENT DOCUMENTS

EP 1496660 A2 1/2005

OTHER PUBLICATIONS

International Search Report from EP Patent Office; for International Application No. PCT/US2009/042670; dated Aug. 13, 2009; pp. 1-8.

* cited by examiner

*Primary Examiner* — Morshed Mehedi
(74) *Attorney, Agent, or Firm* — Faegre Baker Daniels LLP

(57) ABSTRACT

A digital rights management system includes an authentication module and a decryption module. If desired, the modules can be implemented in separate integrated circuits. The authentication module retrieves authentication information for protected content and powers down after the authentication information is retrieved. The decryption module decrypts the protected content based on the authentication information while the authentication module is powered down.

20 Claims, 4 Drawing Sheets

DISTRIBUTED DIGITAL RIGHTS MANAGEMENT SYSTEM AND METHOD

FIELD

The present disclosure generally relates to digital rights management, and more particularly, to reducing power consumption of devices that employ digital rights management.

BACKGROUND

Digital content has gained widespread popularity due to mobile handheld devices and the ease of distribution and storage of such content. Such digital content can include, for example, games, ring tones, photos, music clips, video clips, streaming media, and other suitable content. In order to help reduce unauthorized copying and/or access to such content, various digital rights management (DRM) specifications have been developed such as, for example, Open Mobile Alliance (OMA) DRM. However, in order to utilize DRM for protected content, extra processing is required which increases power consumption of mobile devices.

Furthermore, some mobile devices such as mobile phones, include a primary processor that handles primary functions of the device (e.g. telecommunication functions) and a secondary processor that handles digital content. As such, the power consumption is further increased by utilizing two separate processors.

Because many of the mobile devices to utilize DRM protected content are often battery powered it is desirable, among other things, to reduce power consumption in order to increase battery life.

BRIEF DESCRIPTION OF THE DRAWINGS

The disclosure will be more readily understood in view of the following description when accompanied by the below figures, wherein like reference numerals represent like elements.

DETAILED DESCRIPTION

Figure 1:
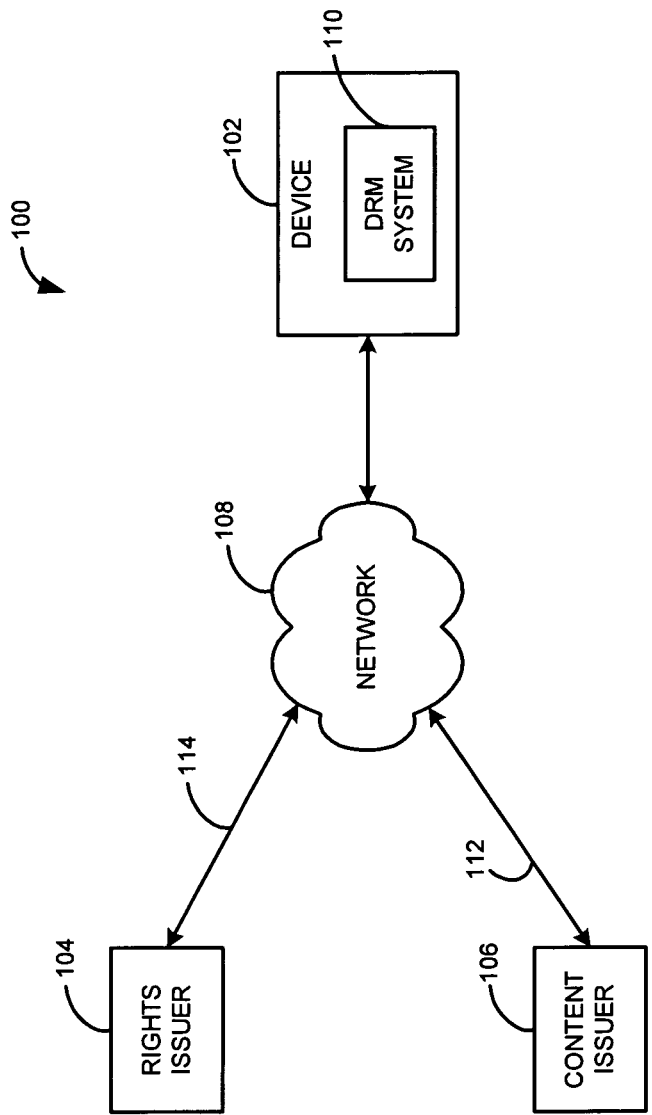
FIG. 1 is an exemplary diagram of the digital rights management distribution system.

In one example, a digital rights management system includes an authentication module and a decryption module. If desired, the modules may be implemented in separate integrated circuits. The authentication module retrieves authentication information for protected content and powers down after the authentication information is retrieved. The decryption module decrypts the protected content based on the authentication information while the authentication module is powered down. A related method is also disclosed.

Among other advantages, the digital rights management system and method consume less power than known digital rights management systems and methods. In one example, the digital rights management system distributes a digital rights management agent between a host processing circuit and a media processing circuit so that the host processing circuit (or portions thereof) can be powered down after obtaining authentication information. Accordingly, by powering down the host processing circuit (or portions thereof), the digital rights management system consumes less power than known digital rights management systems and methods. Other advantages will be recognized by those of ordinary skill in the art.

In one example, the authentication module stores the authentication information in memory prior to powering down. The decryption module retrieves the authentication information from the memory. A media module provides media output information based on the protected content.

In one example, the digital rights management system includes a power management module. The power management module selectively powers up and powers down the authentication module. For example, the power management module powers up the authentication module in response to an authentication request from the decryption module. Also, the power management module powers down the authentication module when the decryption module is decrypting the protected content.

In one example, the digital rights management system includes a communication module. The communication module transmits a request for the authentication information, receives the authentication in response to the request and is operative to power down after receiving the authentication information.

A device includes the digital rights management system and may be a wireless handheld device or any suitable device.

As used herein, the term "circuit" and/or "module" can include an electronic circuit, one or more processors (e.g., shared, dedicated, or group of processors such as but not limited to microprocessors, DSPs, or central processing units) and memory, that execute one or more software or firmware programs, combinational logic circuits, an ASIC, and/or other suitable components that provide the described functionality. A "circuit" or "module" can be "powered down" by reducing power to a desired reduced power level including to a level rendering it inoperative. Likewise, a "circuit" or "module" can be "powered up" by increasing its supply power to a level rendering it operative. Additionally, as will be appreciated by those of ordinary skill in the art, the operation, design, and organization, of a "circuit" or "module" can be described in a hardware description language such as Verilog™, VHDL, or other suitable hardware description languages.

Referring now to FIG. 1, an exemplary diagram of a digital rights management distribution system 100 is depicted. The digital rights management distribution system 100 includes a device 102 such as a handheld mobile media device, a cellular phone, and or other suitable mobile device. The digital rights management distribution system 100 also includes a rights issuer 104 as known in the art and a content issuer 106 as known in the art. Although depicted separately in this example, the rights issuer 104 and the content issuer 106 can be combined into a single rights/content issuer if desired. The rights issuer 104 and the content issuer 106 are in communication with the device 102 via a network 108. The network 108 can be any known network such as a wireless cellular network, a wireless LAN, a packet switched network, a PSTN network, and/or any other suitable network.

The device 102 includes a digital rights management (DRM) system 110. The DRM system 110 acquires authentication information (e.g. a rights object or other suitable authentication information) for protected content (e.g. games, ring tones, photos, music clips, video clips, streaming media, and other suitable protected content) and decrypts the protected content based on the authentication information. For example, the DRM system 110 can request protected content 112 from the content issuer 106 and authentication information 114 for the protected content 112 from the rights issuer 104. The DRM system 110 can then subsequently decrypt the protected content 112 based on the authentication information 114. The DRM system 110 reduces power consumption of the device 102 by selectively powering up and powering down portions of the DRM system 110 as needed.

Figure 2:
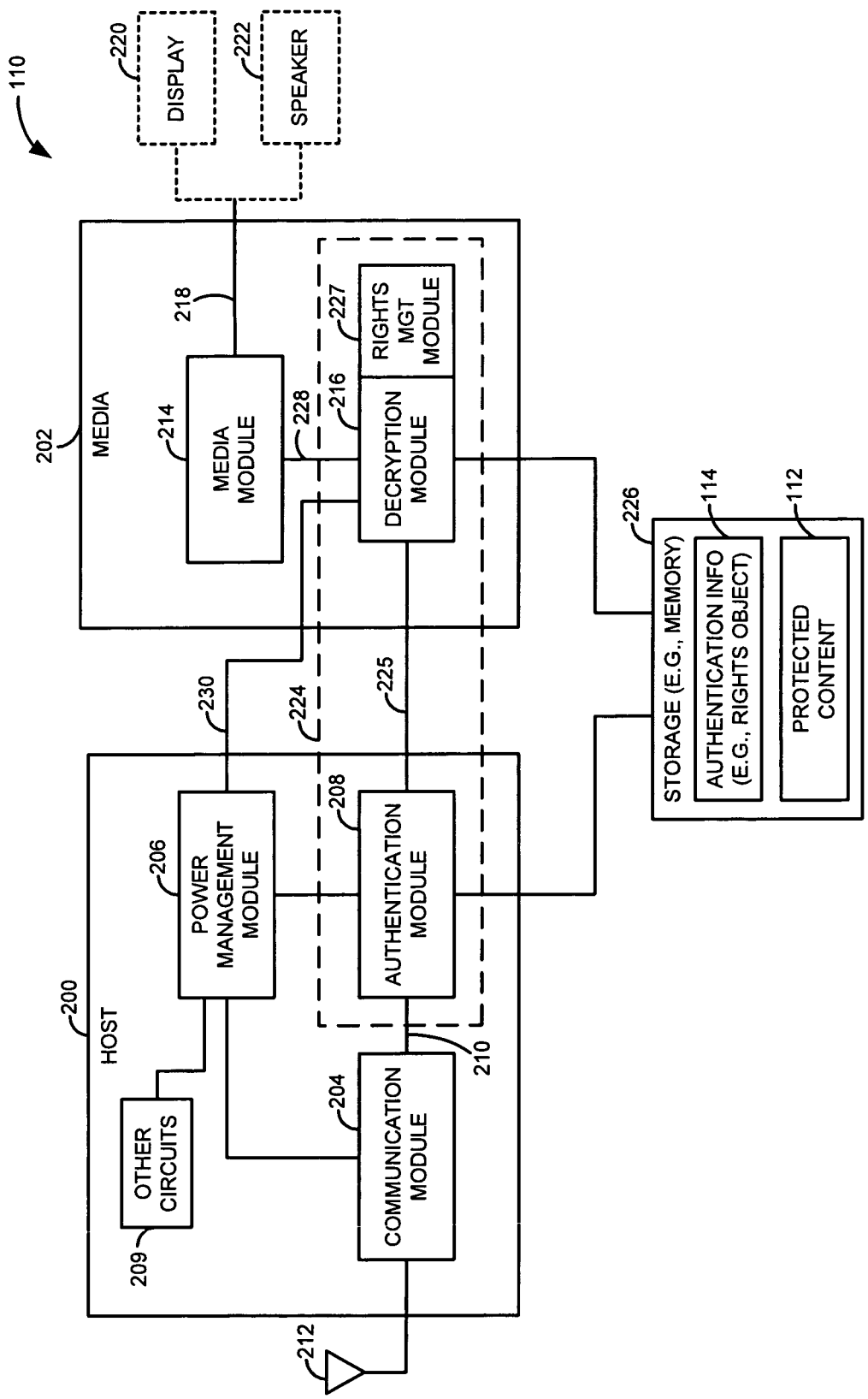
FIG. 2 is an exemplary block diagram of a digital rights management system according to the present disclosure.

Referring now to FIG. 2, an exemplary diagram of the DRM system 110 is depicted. The DRM system 110 includes a host processing circuit 200 and a media processing circuit 202. The host processing circuit 200 includes a communication module 204, a power management module 206, and an authentication module 208. The power management module 206 is operatively coupled to the communication module 204 and the authentication module 208. The authentication module 208 is operatively coupled to the communication module 204.

As will be discussed in more detail below, the power management module 206 selectively powers up and powers down the authentication module 208, and/or the communication module 204 in order to reduce power consumption. In some embodiments, the power management module 206 can selectively power up and power down other circuits 209 of the host processing module 200 as needed in order to further reduce power consumption. In addition, in some embodiments, the power management module 206 can be external to the host processing module 206 and can selectively power up and power down the host processing circuit 200 to further reduce power consumption.

The communication module 204 communicates with the rights issuer 104 and the content issuer 106 via the network 108 in order to retrieve the authentication information 114 and/or the protected content 106. For example, the communication module 204 can transmit a request for the authentication information 114 in response to an authentication request from the authentication module 208 via path 210. The communication module 204 can then subsequently receive the authentication information 114 in response to the request. The communication module 204 includes circuitry commonly known in the art to retrieve digital rights management authentication information and/or protected content. In this example, the device 100 is a wireless handheld device and therefore communicates with the network 108 wirelessly using an antenna 212.

The media processing circuit 202 includes a media module 214 and a decryption module 216. The media module 214 provides media output information 218 (e.g. audio and/or video output) based on the protected content 112. As such, the media module 214 can be any suitable media player known in the art that is capable of providing media output information based on digital media content. In some embodiments, the DRM system 110 can also include a display 220 to provide an image based on the media output information 218 and/or a speaker 222 to provide audio based on the media output information 218.

The authentication module 208 and the decryption module 216 operate collectively as a DRM agent 224 and communicate via path 225 (e.g. an IPC path). As such, the DRM agent 224 is distributed (e.g. split) between the host processing circuit 200 and the media processing circuit 202. By splitting the DRM agent 224 between the host processing circuit 200 and the media processing circuit 202, reduced power consumption can be realized by selectively powering up and down the host processing circuit 200 or portions thereof.

In addition, the DRM agent 224 also includes a rights management module 227. The rights management module 227 is operative to manage permissions (e.g. obtained from a rights object) associated with a protected content 112. The rights management module 227 can be included in either the host processing circuit 200 or the media processing circuit 202. For example, if the permissions limit access to protected content based on the number of times that it is accessed (e.g. the number of times the protected content is played), the rights management module 227 can be included in the media processing circuit 202. However, if for example, the permissions limit access to protected content based on time, the rights management module 227 can be located in the host processing circuit 200 (e.g. assuming the host processing circuit includes a real-time clock and the media processing circuit 202 does not). In this example, the rights management module 227 is included in the media processing circuit 202. However, as noted above, the rights management module 227 could be included within the host processing circuit 200 if desired.

The DRM system 110 also includes memory 226 that stores the authentication information 114 and the protected content 112. The memory 226 can be any suitable storage medium such as, for example, volatile memory, nonvolatile memory, or other suitable storage medium. Although not shown, those having ordinary skill in the art will appreciate that the memory 226 can also store other permissions associated with a rights object.

During operation, the authentication module 208 retrieves the authentication information 114 for the protected content 112 from the rights issuer 104 via the network 108. In addition, the authentication module 208 can retrieve the protected content 112. The authentication module 208 stores the authentication information 114 (and/or protected content 112) in the memory 226 prior to powering down. More specifically, the power management module 206 determines whether the authentication module 208 is in use (e.g. obtaining authentication information) and selectively powers down the authentication module 200 based thereon. For example, the power management module 206 can power down the authentication module 208 after the authentication module 208 has retrieved and stored the authentication information 114 (and/or protected content 112). In addition, the power management module 206 can also power down the communication module 204 when not in use.

The decryption module 216 retrieves the authentication information 114 (and/or protected content 112) from the memory 226. Once retrieved, the decryption module 216 decrypts the protected content 112 based on the authentication information 114 and provides unencrypted content 228 to the media module 214. Because the authentication information 114 has already been obtained by the authentication module 208, the decryption module 216 can independently decrypt the protected content 112 while the authentication module 208 is powered down. As such, power consumption of the DRM system 110 can be reduced.

The media module 214 receives the unencrypted content 228 and provides the media output information 218 based thereon. As previously noted, the media module 214 can provide the media output information 218 to the display 220 and/or the speaker 222 if desired.

In some embodiments, the decryption module 216 can communicate with the power management module 206 via path 230 in order to selectively power up and power down the authentication module 208. For example, the decryption module 216 can request that the power management module 206 power down the authentication module 208 when the decryption module 216 decrypting the protected content 112. In addition, the decryption module 216 can request that the power management module power up the authentication module 208 when authentication information is required for protected content. Furthermore, the decryption module 216 can request that the power management module 206 power up the authentication module 208 in order to obtain timing information from the authentication module 208 (or host processing circuit 200). In other embodiments, the power management module 206 can monitor the authentication module 208, the host processing circuit 200 (or portions thereof) and/or the decryption module 216 in order to selectively power up and power down the authentication module 208 and/or the host processing circuit 200 (or portions thereof).

Figure 3:
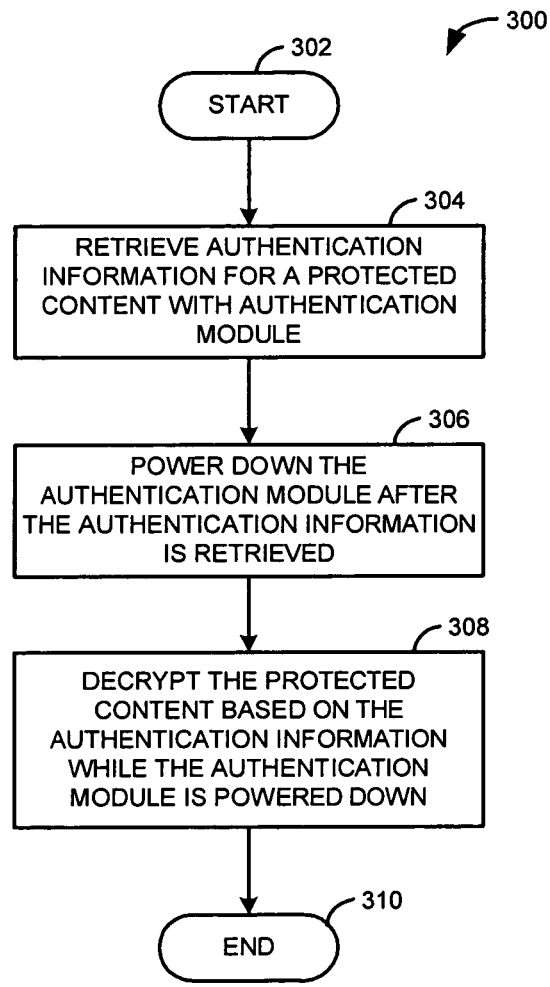
FIG. 3 is a flowchart depicting exemplary steps they can be taken by the digital rights management system.

Referring now to FIG. 3, exemplary steps that can be taken by the DRM system 110 are generally identified at 300. The process starts in step 302. In step 304, the authentication module 208 retrieves the authentication information 114 for the protected content 112. In some embodiments, the authentication module 208 can retrieve the authentication information 114 in response to a request from the decryption module 216. In step 306, the power management module 206 powers down the authentication module 218 after the authentication information 114 is retrieved. In step 308, the decryption module 216 decrypts the protected content 112 based on the authentication information 114 while the authentication module 208 is powered down. As such, power consumption of the DRM system 110 can be reduced by powering down authentication module 208 while the decryption module 216 is decrypting the protected content 112. The process ends in step 310.

Figure 4:
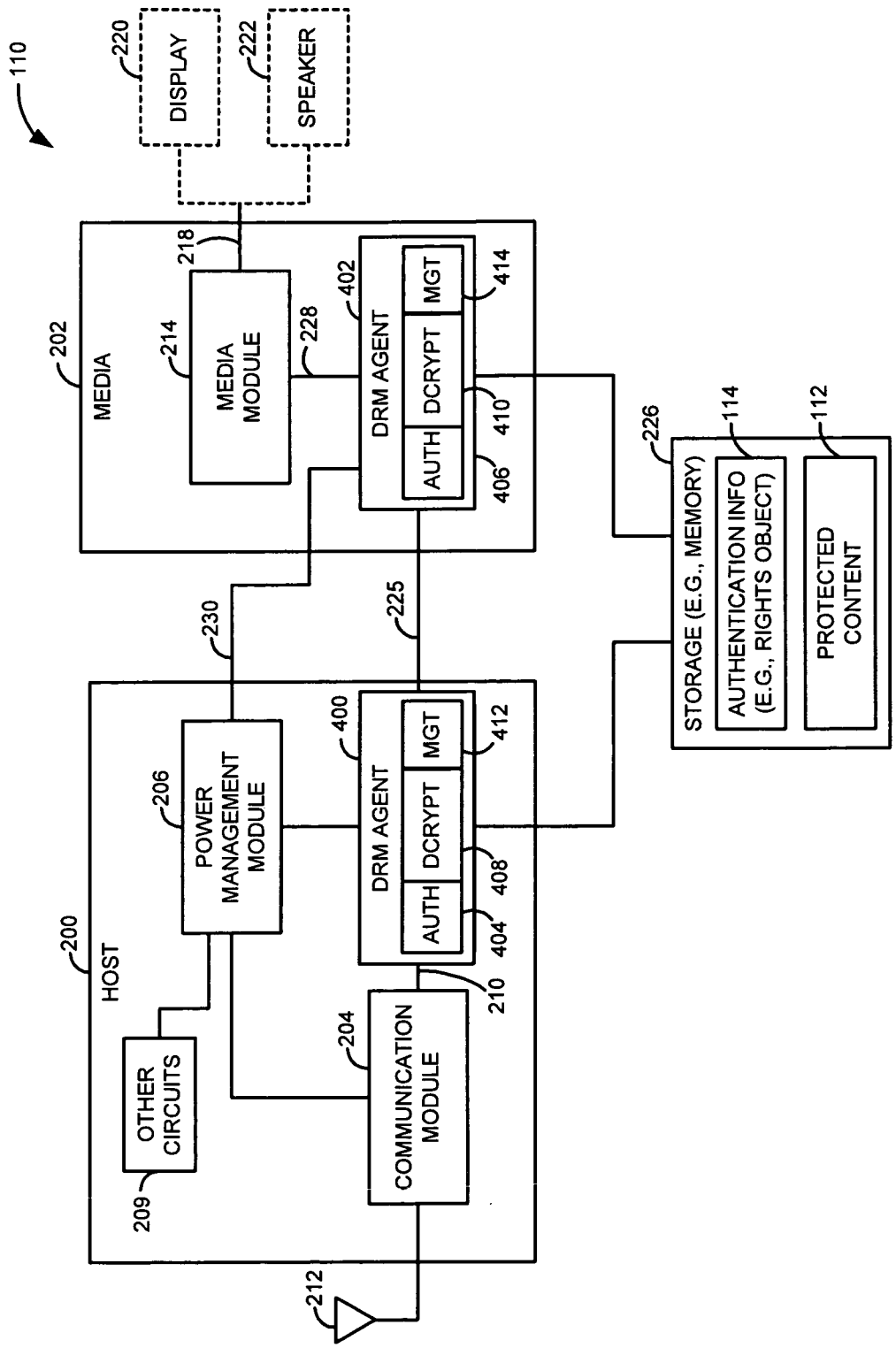
FIG. 4 is an exemplary block diagram of an alternative embodiment of the digital rights management system.

Referring now to FIG. 4, an exemplary block diagram of an alternate embodiment of the DRM system 110 is depicted. In this example, the host processing circuit 200 and the media processing circuit 202 both include a complete DRM agent 400 and 402, respectively. Each DRM agent 400, 402 includes an authentication module 404, 406, respectively, a decryption module 408, 410, respectively, and, a rights management module 412, 414, respectively. However, since the decryption module 408 of DRM agent 400 and the authentication module 406 of DRM agent 402 are redundant, the power management module 206 can power them down during operation to reduce power consumption. In addition, the power management module 206 can also power down one of the rights management modules 412 or 414 in order to reduce power consumption. As such, the authentication module 404 can operate as the authentication module 208 of FIG. 2, the decryption module 410 can operate as the decryption module 216 of FIG. 2, and one of the rights management modules 412 or 411 can operate as the rights management module 227 of FIG. 2 to further reduce power consumption of the DRM system 110.

As noted above, among other advantages, a digital rights management system and method is provided that consumes less power than known digital rights management systems. The digital rights management system distributes a digital rights management agent between a host processing circuit and a media processing circuit so that the host processing circuit (or portions thereof) can be powered down after obtaining authentication information. Accordingly, by powering down the host processing circuit (or portions thereof), the digital rights management system consumes less power than known digital rights management systems. Other advantages will be recognized by those of ordinary skill in the art.

Also, integrated circuit design systems (e.g., work stations) are known that create integrated circuits based on executable information stored on a computer readable memory such as but not limited to CDROM, RAM, other forms of ROM, hard drives, distributed memory etc. The information may include data representing (e.g., compiled or otherwise represented) any suitable language such as, but not limited to, hardware descriptor language or other suitable language. As such, the circuits and/or modules described herein may also be produced as integrated circuits by such systems. For example, an integrated circuit may be created for use in a display using information stored on a computer readable medium that when executed cause the integrated circuit design system to create an integrated circuit that includes an authentication module and a decryption module. The authentication module is operative to retrieve authentication information for protected content. The authentication module is operative to powers down after the authentication information is retrieved. The decryption module is operative to decrypt the protected content based on the authentication information while the authentication module is powered down. Integrated circuits having a circuit and/or module that performs other operations described herein may also be suitable produced.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. A digital rights management system, comprising:
  an authentication module that is operative to retrieve authentication information for protected content and to reduce power after the authentication information is retrieved,
  the authentication module further operative to store the authentication information in memory prior to reducing power, the memory being powered independently of the authentication module; and
  a decryption module that is operative to receive and decrypt the protected content based on the authentication information, the decryption module being operative to receive and decrypt the protected content while power of the authentication module is reduced.

2. The digital rights management system of claim 1 wherein the decryption module is operative to retrieve the authentication information from the memory.

3. The digital rights management system of claim 1 further comprising a media module that is operative to provide media output information based on the protected content.

4. The digital rights management system of claim 1 further comprising a power management module that is operative to selectively power up and reduce power of the authentication module.

5. The digital rights management system of claim 4 wherein the power management module is operative to power up the authentication module in response to an authentication request from the decryption module.

6. The digital lights management system of claim 4 wherein the power management module is operative to reduce power of the authentication module when the decryption module is decrypting the protected content.

7. The digital rights management system of claim 1 further comprising a communication module that is operative to transmit a request for the authentication information and to receive the authentication information in response to the request.

8. The digital rights management system of claim 7 wherein the communication module is operative to reduce power after receiving the authentication information.

9. A device comprising the digital rights management system of claim 1.

10. A digital rights management method, comprising:
retrieving, with an authentication module, authentication information for a protected content;
storing the authentication information in memory that is powered independently of the authentication module;
reducing power of the authentication module after the authentication information is retrieved; and
providing the authentication information to a decryption module while power of the authentication module is reduced;
decrypting the protected content based on the authentication information while power to the authentication module is reduced.

11. The digital rights management method of claim 10 further comprising:
retrieving the stored authentication information prior to decrypting the protected content; and
providing media output information based on the protected content.

12. The digital rights management method of claim 10 further comprising selectively powering up and reducing power of the authentication module.

13. The digital rights management method of claim 12 further comprising:
powering up the authentication module in response to an authentication request; and
reducing power of the authentication module when the decryption module is decrypting the protected content.

14. A device, comprising:
a first circuit that comprises:
an authentication module that is operative to retrieve authentication information for a protected content and to reduce power after the authentication information is retrieved;
a memory;
a power management module that is operative to selectively power up and reduce power to the authentication module independently of the memory, the authentication module being operative to store the authentication information in the memory prior to reducing power; and
a communication module that is operative to wirelessly transmit a request for the authentication information and to wirelessly receive the authentication in response to the request; and
a second circuit that comprises:
a decryption module that is operative to both retrieve the authentication information and decrypt the protected content based on the authentication information while power of the first circuit is reduced; and
a media module that is operative to provide media output information based on the protected content.

15. The device of claim 14 wherein the decryption module is operative to retrieve the authentication information from the memory.

16. The device of claim 14 wherein the power management module is operative to power up the authentication module in response to an authentication request from the decryption module and to reduce power of the authentication module when the decryption module is decrypting the protected content.

17. The device of claim 14 further comprising at least one of:
a display that is operative to provide an image based on the media output information; and
a speaker that is operative to provide audio based on the media output information.

18. The device of claim 14 wherein the communication module is powered up while power of the authentication module is reduced.

19. A method of managing digital rights content, comprising:
retrieving, with an authentication module, authentication information for protected content;
storing the authentication information in memory that is powered independently of the authentication module;
reducing power of the authentication module after the authentication information is retrieved;
providing the authentication information to a decryption module while power of the authentication module is reduced, and
decrypting the protected content based on the authentication information while power of the authentication module is reduced.

20. The system of claim 1, wherein the memory is accessible by the decryption module without involvement of the authentication module.

* * * * *